US008396576B2

(12) United States Patent
Kraemer et al.

(10) Patent No.: US 8,396,576 B2
(45) Date of Patent: Mar. 12, 2013

(54) SYSTEM FOR ADAPTIVELY STREAMING AUDIO OBJECTS

(75) Inventors: Alan D. Kraemer, Tustin, CA (US); James Tracey, Santa Ana, CA (US); Themis Katsianos, Highland, CA (US)

(73) Assignee: DTS LLC, Calabasas, CA (US)

( * ) Notice: Subject to any disclaimer, the term of this patent is extended or adjusted under 35 U.S.C. 154(b) by 0 days.

(21) Appl. No.: 12/856,449

(22) Filed: Aug. 13, 2010

(65) Prior Publication Data

US 2011/0040396 A1 Feb. 17, 2011

Related U.S. Application Data

(60) Provisional application No. 61/233,931, filed on Aug. 14, 2009.

(51) Int. Cl.
*G06F 17/00* (2006.01)
*G06F 15/16* (2006.01)

(52) U.S. Cl. .......................................... 700/94; 709/231

(58) Field of Classification Search .................... 700/94; 709/217, 219, 231, 232; 381/17, 119
See application file for complete search history.

(56) References Cited

U.S. PATENT DOCUMENTS 4,332,979 A 6/1982 Fischer
5,592,588 A 1/1997 Reekes et al.
6,108,626 A 8/2000 Cellario et al.
6,160,907 A 12/2000 Robotham et al.
7,006,636 B2 2/2006 Baumgarte et al.
7,116,787 B2 10/2006 Faller
7,164,769 B2 1/2007 Beard
7,292,901 B2 11/2007 Baumgarte et al.
7,295,994 B2 11/2007 Yoshida et al.
7,394,903 B2 7/2008 Herre et al.
7,583,805 B2 9/2009 Baumgarte et al.
7,680,288 B2 3/2010 Melchior et al.
2003/0219130 A1 11/2003 Baumgarte et al.
2005/0105442 A1 5/2005 Melchior et al.
2005/0147257 A1 7/2005 Melchoir et al.

(Continued)

FOREIGN PATENT DOCUMENTS

WO WO 2008/035275 3/2008
WO WO 2008/084436 7/2008

(Continued)

OTHER PUBLICATIONS

International Search Report and Written Opinion for PCT/US10/45530 mailed Sep. 30, 2010.

(Continued)

*Primary Examiner* — Joseph Saunders, Jr.
(74) *Attorney, Agent, or Firm* — Knobbe Martens Olson & Bear LLP

(57) ABSTRACT

Systems and methods for providing object-oriented audio are described. Audio objects can be created by associating sound sources with attributes of those sound sources, such as location, velocity, directivity, and the like. Audio objects can be used in place of or in addition to channels to distribute sound, for example, by streaming the audio objects over a network to a client device. The objects can define their locations in space with associated two or three dimensional coordinates. The objects can be adaptively streamed to the client device based on available network or client device resources. A renderer on the client device can use the attributes of the objects to determine how to render the objects. The renderer can further adapt the playback of the objects based on information about a rendering environment of the client device. Various examples of audio object creation techniques are also described.

4 Claims, 11 Drawing Sheets

U.S. PATENT DOCUMENTS

| | | | |
|---|---|---|---|
| 2006/0206221 A1 | 9/2006 | Metcalf | |
| 2008/0005347 A1 | 1/2008 | Ott | |
| 2008/0140426 A1 | 6/2008 | Kim et al. | |
| 2008/0310640 A1 | 12/2008 | Oh et al. | |
| 2009/0034613 A1 | 2/2009 | Youm | |
| 2009/0060236 A1 | 3/2009 | Johnston et al. | |
| 2009/0082888 A1 | 3/2009 | Johansen | |
| 2009/0164222 A1 | 6/2009 | Kim et al. | |
| 2009/0225993 A1 | 9/2009 | Cvetkovic | |
| 2009/0237564 A1 | 9/2009 | Kikinis et al. | |
| 2009/0326960 A1 | 12/2009 | Breebaat | |
| 2010/0135510 A1 | 6/2010 | Yoo et al. | |
| 2011/0013790 A1* | 1/2011 | Hilpert et al. | 381/300 |
| 2011/0040395 A1 | 2/2011 | Kraemer et al. | |
| 2012/0057715 A1 | 3/2012 | Johnston et al. | |
| 2012/0082319 A1 | 4/2012 | Jot et al. | |

FOREIGN PATENT DOCUMENTS

| | | |
|---|---|---|
| WO | WO 2008143561 | 11/2008 |
| WO | WO 2009001277 | 12/2008 |
| WO | WO 2009001292 | 12/2008 |

OTHER PUBLICATIONS

International Search Report and Written Opinion for PCT/US10/45532 mailed Oct. 25, 2010.

Amatriain at al, Audio Content Transmission [online]. Proceeding of the COST G-6 Conference on Digital Audio Effects (DAFX-01). 2001. [retrieved on Sep. 25, 2010]. Retrieved from the Internet <URL: http://www.csis.ul.ieldafx01|proceedingsipapers/am:atrlaln.pdf> pp. 1-6.

Ahmed et al. Adaptive Packet Video Streaming Over IP Networks: A Cross-Layer Approach [online]. IEEE Journal on Selected Areas in Communications, vol. 23, No. 2 Feb. 2005 [retrieved on Sep. 25, 2010]. Retrieved from the internet <URL: hllp://bcr2.uwaterloo.ca/~rboutaba/Papers/Journals/JSA-5__2.pdf> entire document.

MPEG-7 Overview, Standard [online]. International Organisation for Standardisation. 2004 [retrieved on Sep. 25, 2010). Retrieved from the Internet: <URL: http//mpeg.chiariglione.org/standards/mpeg-7/mpeg-7.htm> entire document.

Sontacchi et al. Demonstrator for Controllable Focused Sound Source Reproduction. [online] 2008. [retrieved on Sep. 28, 2010). Retrieved from the internet: <URL: htlp://iem.at/projekte/publlcatlons/paper/demonstrar/demonstrator.pdf> entire document.

Goor et al. An Adaptive MPEG-4 Streaming System Based on Object Prioritisation [online]. ISSC. 2003. [retrieved on Sep. 25, 2010]. Retrieved from the Internet <URL: http://www.csis.ul.ie/ dafx01/proceedings/papers/amatriain.pdf> pp. 1-5, entire document.

Advanced Multimedia Supplements API for Java 2 Micro Edition, May 17, 2005, JSR-234 Expert Group.

Engdegard et al., Spatial Audio Object Coding (SAOC)—The Upcoming MPEG Standard on Parametric Object Based Audio Coding, May 17-20, 2008.

Potard et al., Using XML Schemas to Create and Encode Interactive 3-D Audio Scenes for Multimedia and Virtual Reality Applications, 2002.

Gatzsche et al., Beyond DCI: The Integration of Object-Oriented 3D Sound Into the Digital Cinema, In Proc. 2008 NEM Summit, pp. 247-251. Saint-Malo, Oct. 15, 2008.

International Preliminary Report on Patentability issued in application No. PCT/US2010/045532 on Feb. 14, 2012.

International Preliminary Report on Patentability issued in application No. PCT/US2010/045530 on Sep. 28, 2011.

ISO/IEC 23003-2:2010(E) International Standard—Information technology—MPEG audio technologies—Part 2: Spatial Audio Object Coding (SAOC), Oct. 1, 2010.

Jot, et al. Beyond Surround Sound—Creation, Coding and Reproduction of 3-D Audio Soundtracks. Audio Engineering Society Convention Paper 8463 presented at the 131st Convention Oct. 2-23, 2011.

Pulkki, Ville. Virtual Sound Source Positioning Using Vector Base Amplitude Panning. Audio Engineering Society, Inc. 1997.

AES Convention Paper Presented at the 107$^{th}$ Convention, Sep. 24-27, 1999, New York "Room Simulation for Multichannel Film and Music" Knud Bank Christensen and Thomas Lund.

AES Convention Paper Presented at the 124$^{th}$ Convention, May 17-20, 2008, Amsterdam, The Netherlands "Spatial Audio Object Coding (SAOC)" The Upcoming MPEG Standard on Parametric Object Based Audio Coding.

International Search Report in corresponding PCT Application No. PCT/US2011/050885, on Dec. 8, 2011.

International Search Report and Written Opinion issued in application No. PCT/US2012/028325 on Aug. 6, 2012.

* cited by examiner

ADAPTIVE RENDERING PROCESS

SYSTEM FOR ADAPTIVELY STREAMING AUDIO OBJECTS

RELATED APPLICATION

This application claims the benefit of priority under 35 U.S.C. §119(e) of U.S. Provisional Patent Application No. 61/233,931, filed on Aug. 14, 2009, and entitled "Production, Transmission, Storage and Rendering System for Multi-Dimensional Audio," the disclosure of which is hereby incorporated by reference in its entirety.

BACKGROUND

Existing audio distribution systems, such as stereo and surround sound, are based on an inflexible paradigm implementing a fixed number of channels from the point of production to the playback environment. Throughout the entire audio chain, there has traditionally been a one-to-one correspondence between the number of channels created and the number of channels physically transmitted or recorded. In some cases, the number of available channels is reduced through a process known as mix-down to accommodate playback configurations with fewer reproduction channels than the number provided in the transmission stream. Common examples of mix-down are mixing stereo to mono for reproduction over a single speaker and mixing multi-channel surround sound to stereo for two-speaker playback.

Audio distribution systems are also unsuited for 3D video applications because they are incapable of rendering sound accurately in three-dimensional space. These systems are limited by the number and position of speakers and by the fact that psychoacoustic principles are generally ignored. As a result, even the most elaborate sound systems create merely a rough simulation of an acoustic space, which does not approximate a true 3D or multi-dimensional presentation.

SUMMARY

Systems and methods for providing object-oriented audio are described. In certain embodiments, audio objects are created by associating sound sources with attributes of those sound sources, such as location, velocity, directivity, and the like. Audio objects can be used in place of or in addition to channels to distribute sound, for example, by streaming the audio objects over a network to a client device. The objects can define their locations in space with associated two or three dimensional coordinates. The objects can be adaptively streamed to the client device based on available network or client device resources. A renderer on the client device can use the attributes of the objects to determine how to render the objects. The renderer can further adapt the playback of the objects based on information about a rendering environment of the client device. Various examples of audio object creation techniques are also described.

For purposes of summarizing the disclosure, certain aspects, advantages and novel features of the inventions have been described herein. It is to be understood that not necessarily all such advantages can be achieved in accordance with any particular embodiment of the inventions disclosed herein. Thus, the inventions disclosed herein can be embodied or carried out in a manner that achieves or optimizes one advantage or group of advantages as taught herein without necessarily achieving other advantages as can be taught or suggested herein.

BRIEF DESCRIPTION OF THE DRAWINGS

Throughout the drawings, reference numbers are re-used to indicate correspondence between referenced elements. The drawings are provided to illustrate embodiments of the inventions described herein and not to limit the scope thereof.

DETAILED DESCRIPTION

I. Introduction

In addition to the problems with existing systems described above, audio distribution systems do not adequately take into account the playback environment of the listener. Instead, audio systems are designed to deliver the specified number of channels to the final listening environment without any compensation for the environment, listener preferences, or the implementation of psychoacoustic principles. These functions and capabilities are traditionally left to the system integrator.

This disclosure describes systems and methods for streaming object-oriented audio that address at least some of these problems. In certain embodiments, audio objects are created by associating sound sources with attributes of those sound sources, such as location, velocity, directivity, and the like. Audio objects can be used in place of or in addition to channels to distribute sound, for example, by streaming the audio objects over a network to a client device. In certain embodiments, these objects are not related to channels or panned positions between channels, but rather define their locations in space with associated two or three dimensional coordinates. A renderer on the client device can use the attributes of the objects to determine how to render the objects.

The renderer can also account for the renderer's environment in certain embodiments by adapting the rendering and/or streaming based on available computing resources. Similarly, streaming of the audio objects can be adapted based on network conditions, such as available bandwidth. Various examples of audio object creation techniques are also described. Advantageously, the systems and methods described herein can reduce or overcome the drawbacks associated with the rigid audio channel distribution model.

Figure 1A:
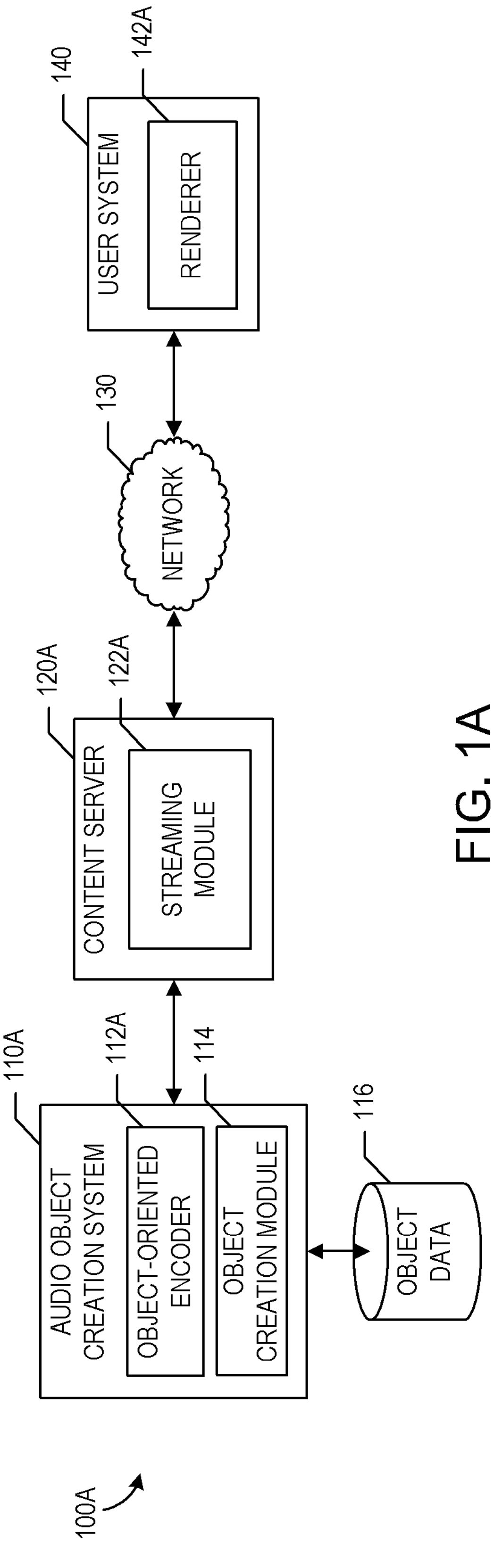
FIGS. 1A and 1B illustrate embodiments of object-oriented audio systems.
Figure 1B:
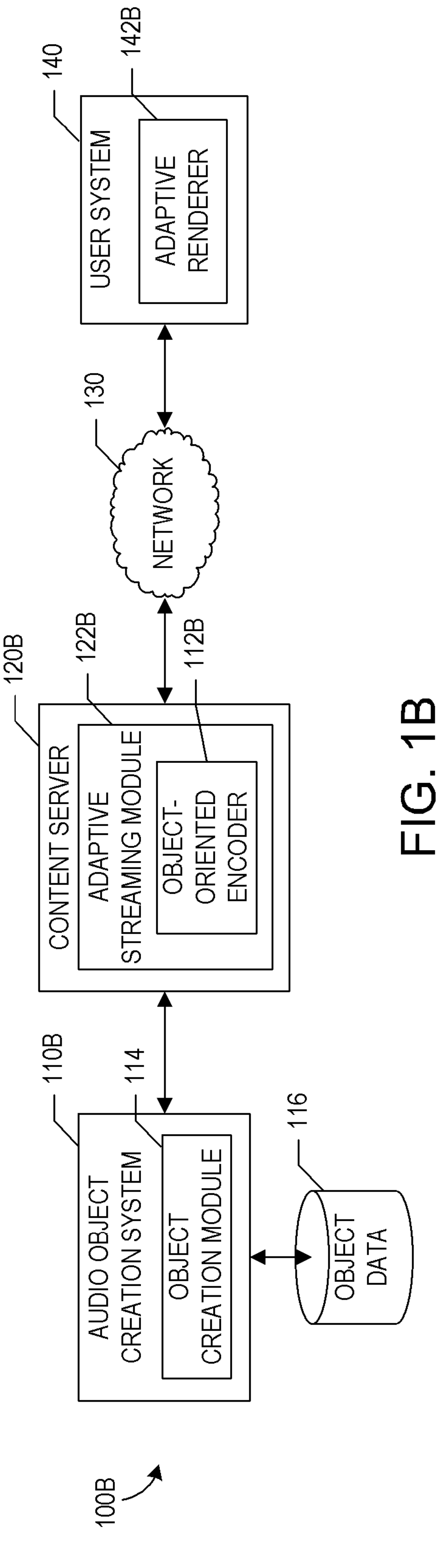
Figure 6:
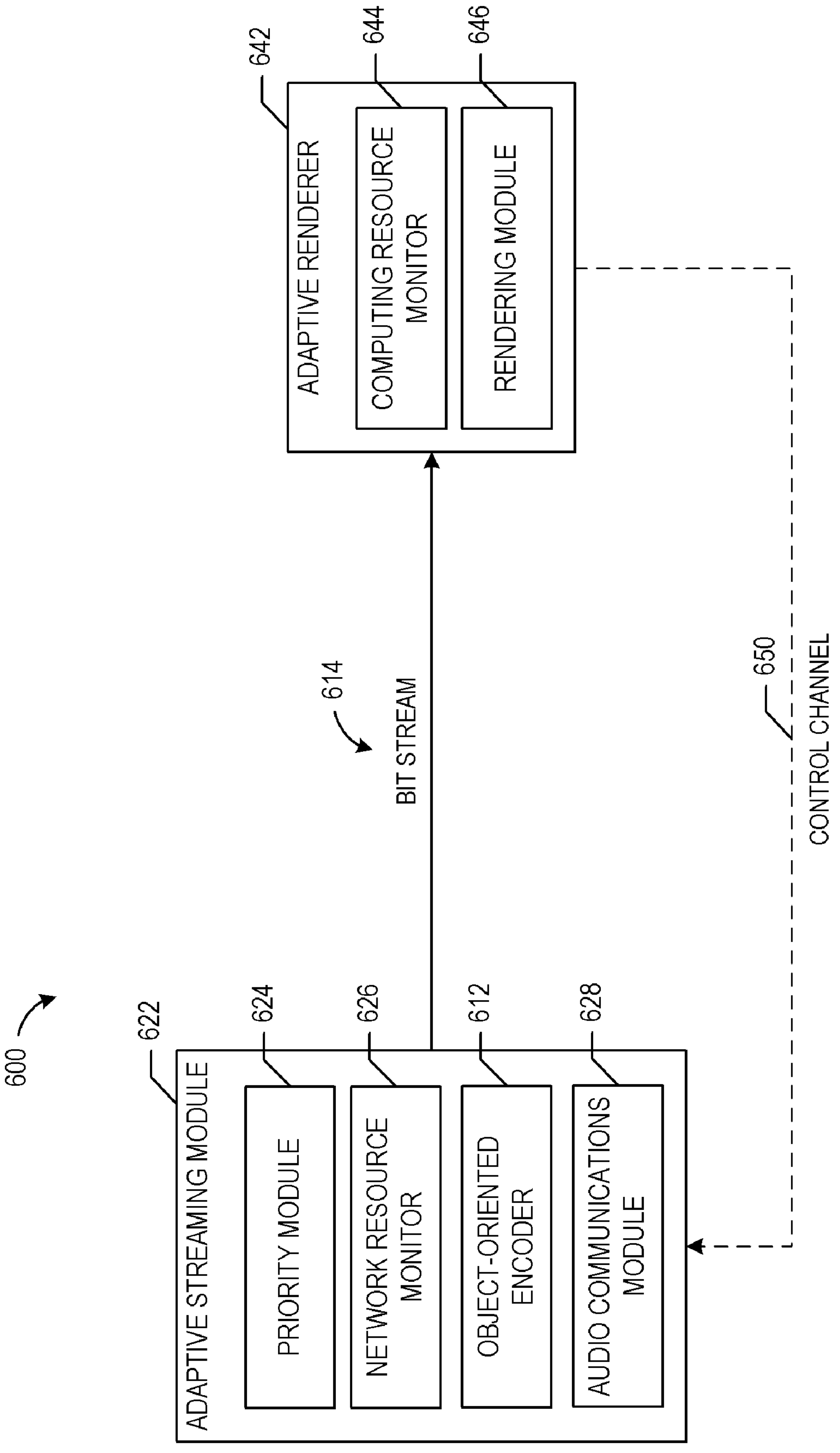
FIG. 6 illustrates an embodiment of an adaptive audio object streaming system.
Figure 7:
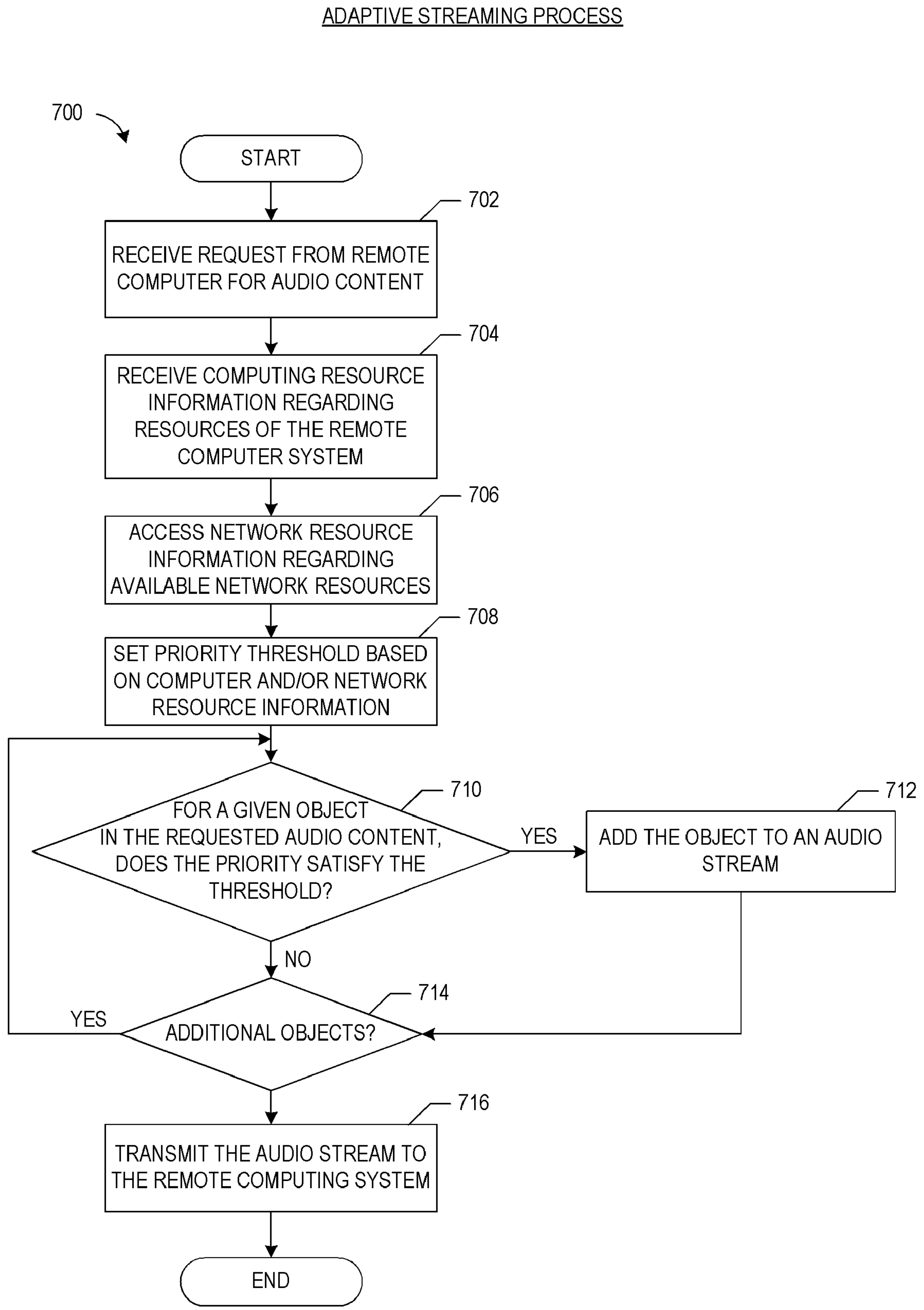
FIG. 7 illustrates an embodiment of an adaptive audio object streaming process.
Figure 8:
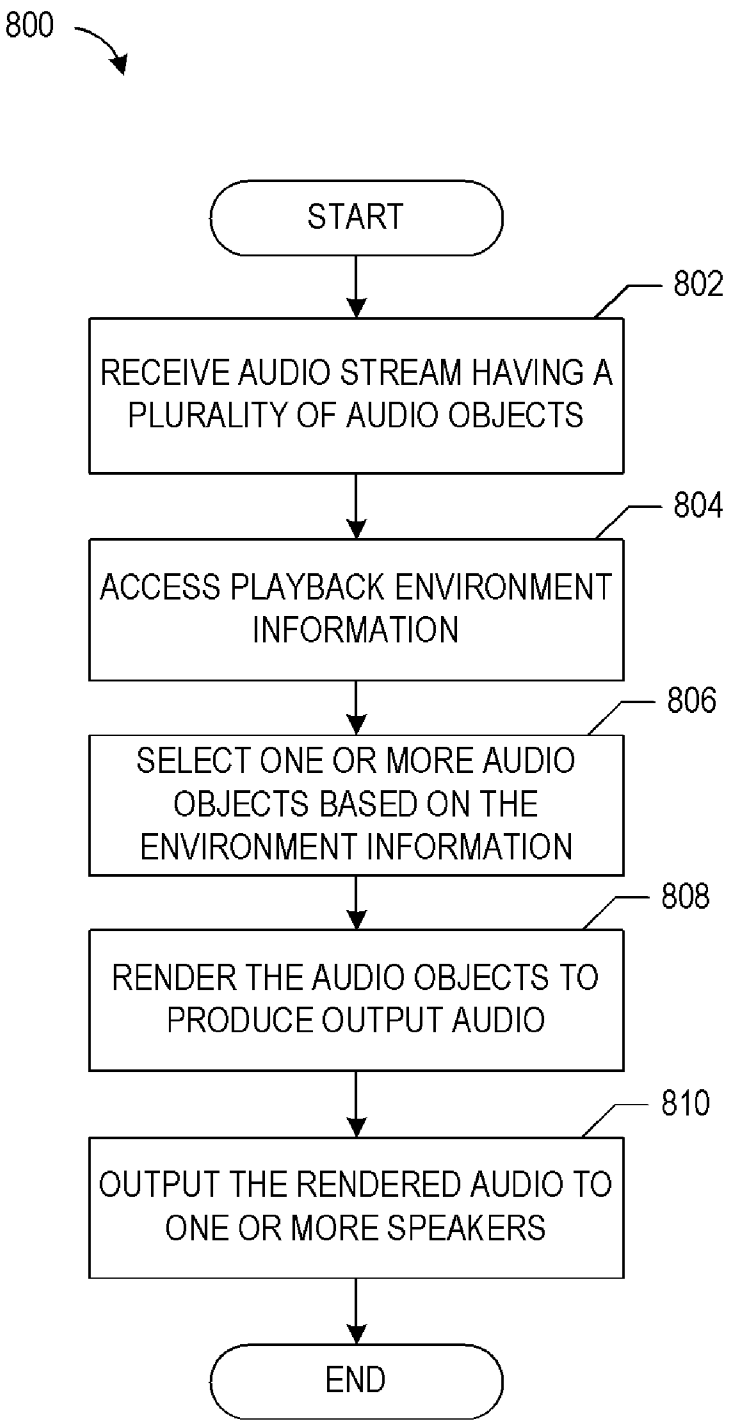
FIG. 8 illustrates an embodiment of an adaptive audio object rendering process.
Figure 9:
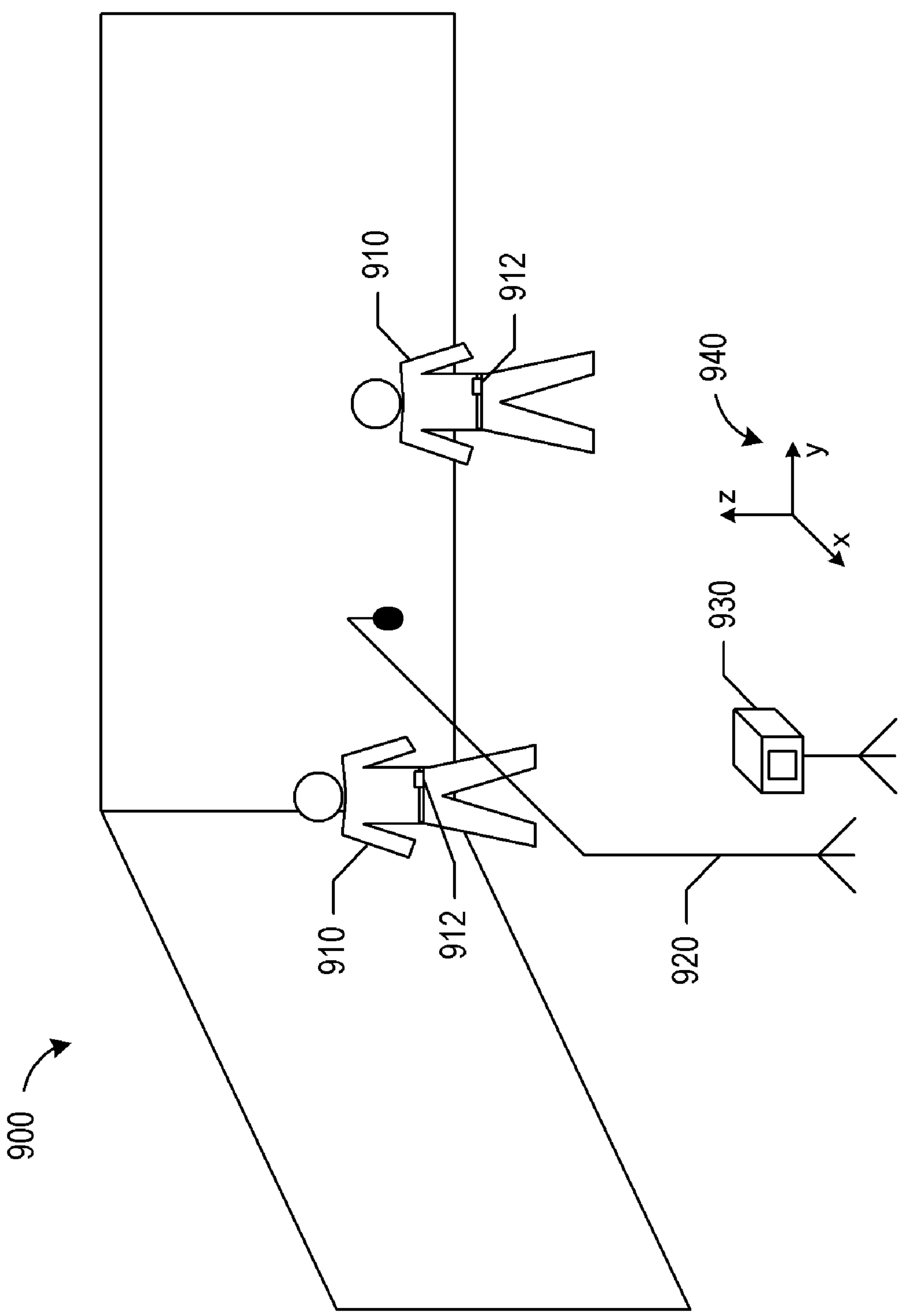
FIG. 9 illustrates an example scene for object-oriented audio capture.
Figure 10:
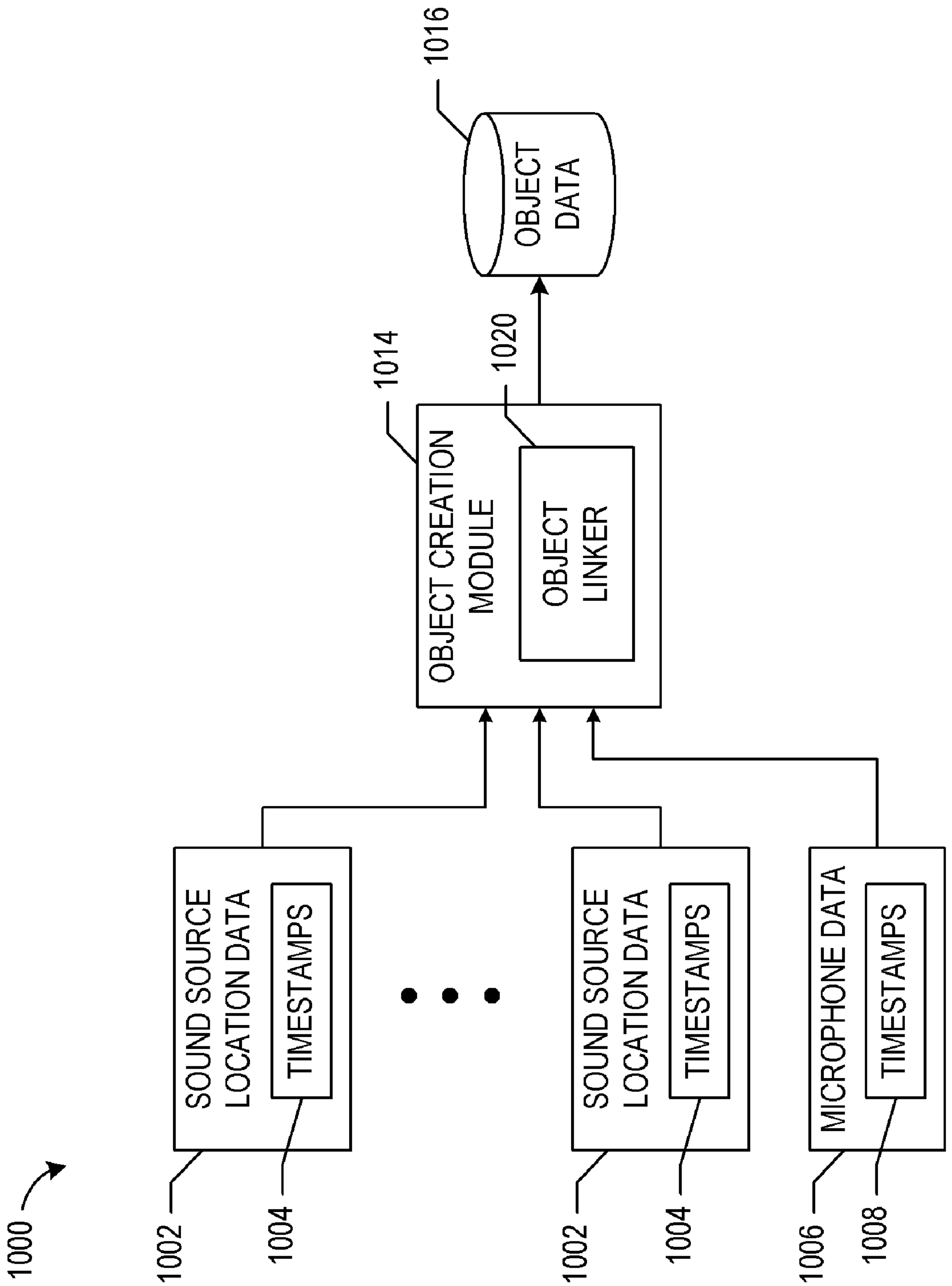
FIG. 10 illustrates an embodiment of a system for object-oriented audio capture.
Figure 11:
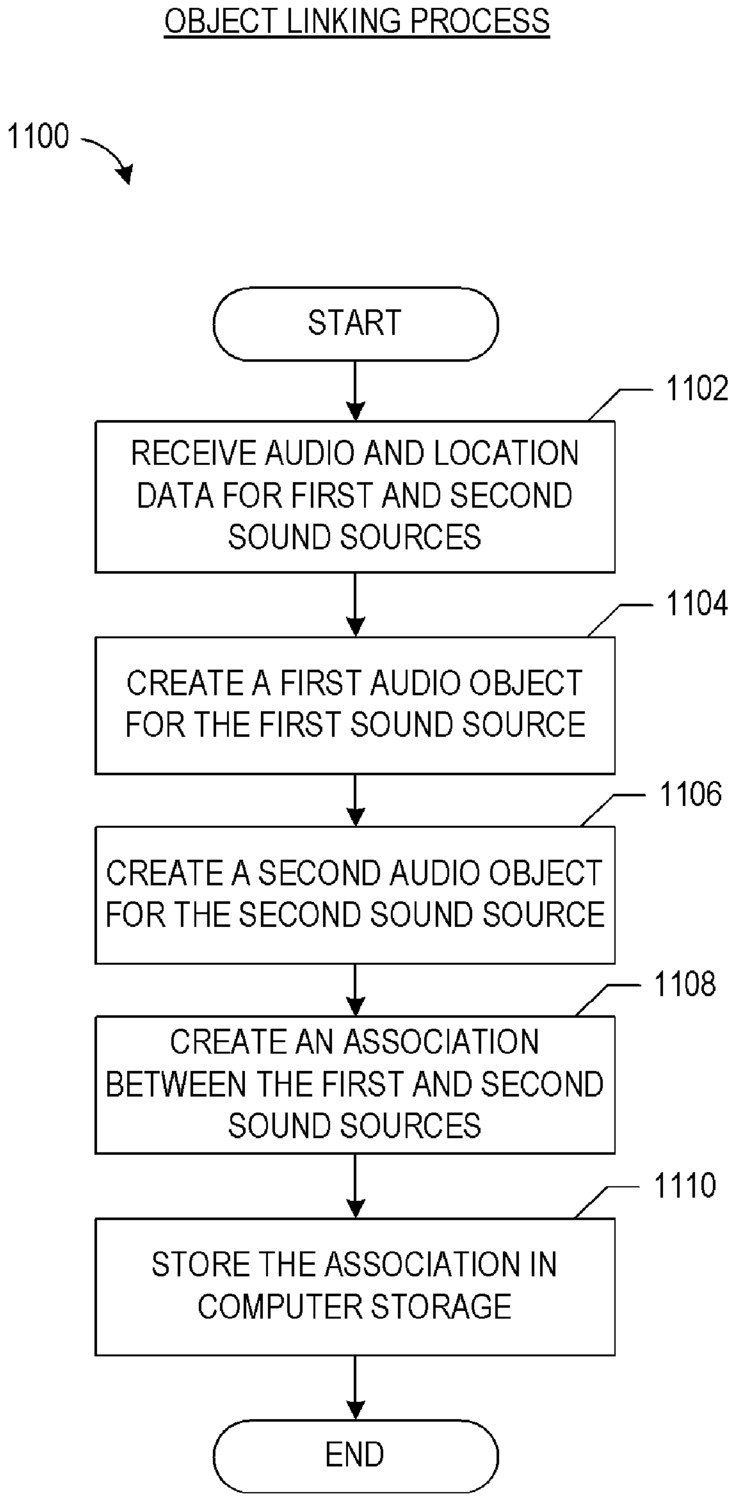
FIG. 11 illustrates an embodiment of a process for object-oriented audio capture.

By way of overview, FIGS. 1A and 1B introduce embodiments of object-oriented audio systems. Later Figures describe techniques that can be implemented by these object-oriented audio systems. For example, FIGS. 2 through 5B describe various example techniques for streaming object-oriented audio. FIGS. 6 through 8 describe example techniques for adaptively streaming and rendering object-oriented audio based on environment and network conditions. FIGS. 9 through 11 describe example audio object creation techniques.

As used herein, the term "streaming" and its derivatives, in addition to having their ordinary meaning, can mean distribution of content from one computing system (such as a server) to another computing system (such as a client). The term "streaming" and its derivatives can also refer to distributing content through peer-to-peer networks using any of a variety of protocols, including BitTorrent and related protocols.

II. Object-Oriented Audio System Overview

FIGS. 1A and 1B illustrate embodiments of object-oriented audio systems 100A, 100B. The object-oriented audio systems 100A, 100B can be implemented in computer hardware and/or software. Advantageously, in certain embodiments, the object-oriented audio systems 100A, 100B can enable content creators to create audio objects, stream such objects, and render the objects without being bound to the fixed channel model.

Referring specifically to FIG. 1A, the object-oriented audio system 100A includes an audio object creation system 110A, a streaming module 122A implemented in a content server 120A, and a renderer 142A implemented in a user system 140. The audio object creation system 110A can provide functionality for users to create and modify audio objects. The streaming module 122A, shown installed on a content server 120A, can be used to stream audio objects to a user system 140 over a network 130. The network 130 can include a LAN, a WAN, the Internet, or combinations of the same. The renderer 142A on the user system 140 can render the audio objects for output to one or more loudspeakers.

In the depicted embodiment, the audio object creation system 110A includes an object creation module 114 and an object-oriented encoder 112A. The object creation module 114 can provide functionality for creating objects, for example, by associating audio data with attributes of the audio data. Any type of audio can be used to generate an audio object. Some examples of audio that can be generated into objects and streamed can include audio associated with movies, television, movie trailers, music, music videos, other online videos, video games, and the like.

Initially, audio data can be recorded or otherwise obtained. The object creation module 114 can provide a user interface that enables a user to access, edit, or otherwise manipulate the audio data. The audio data can represent a sound source or a collection of sound sources. Some examples of sound sources include dialog, background music, and sounds generated by any item (such as a car, an airplane, or any prop). More generally, a sound source can be any audio clip.

Sound sources can have one or more attributes that the object creation module 114 can associate with the audio data to create an object. Examples of attributes include a location of the sound source, a velocity of a sound source, directivity of a sound source, and the like. Some attributes may be obtained directly from the audio data, such as a time attribute reflecting a time when the audio data was recorded. Other attributes can be supplied by a user to the object creation module 114, such as the type of sound source that generated the audio (e.g., a car versus an actor). Still other attributes can be automatically imported by the object creation module 114 from other devices. As an example, the location of a sound source can be retrieved from a Global Positioning System (GPS) device or the like and imported into the object creation module 114. Additional examples of attributes and techniques for identifying attributes are described in greater detail below. The object creation module 114 can store the audio objects in an object data repository 116, which can include a database or other data storage.

The object-oriented encoder 112A can encode one or more audio objects into an audio stream suitable for transmission over a network. In one embodiment, the object-oriented encoder 112A encodes the audio objects as uncompressed PCM (pulse code modulated) audio together with associated attribute metadata. In another embodiment, the object-oriented encoder 112A also applies compression to the objects when creating the stream.

Advantageously, in certain embodiments, the audio stream generated by the object-oriented encoder can include at least one object represented by a metadata header and an audio payload. The audio stream can be composed of frames, which can each include object metadata headers and audio payloads. Some objects may include metadata only and no audio payload. Other objects may include an audio payload but little or no metadata. Examples of such objects are described in detail below.

The audio object creation system 110A can supply the encoded audio objects to the content server 120A over a network (not shown). The content server 120A can host the encoded audio objects for later transmission. The content server 120A can include one or more machines, such as physical computing devices. The content server 120A can be accessible to user systems over the network 130. For instance, the content server 120A can be a web server, an edge node in a content delivery network (CDN), or the like.

The user system 140 can access the content server 120A to request audio content. In response to receiving such a request, the content server 120A can stream, upload, or otherwise transmit the audio content to the user system 140. Any form of computing device can access the audio content. For example, the user system 140 can be a desktop, laptop, tablet, personal digital assistant (PDA), television, wireless handheld device (such as a phone), or the like.

The renderer 142A on the user system 140 can decode the encoded audio objects and render the audio objects for output to one or more loudspeakers. The renderer 142A can include a variety of different rendering features, audio enhancements, psychoacoustic enhancements, and the like for rending the audio objects. The renderer 142A can use the object attributes of the audio objects as cues on how to render the audio objects.

Referring to FIG. 1B, the object-oriented audio system 100B includes many of the features of the system 100A, such as an audio object creation system 110B, a content server 120B, and a user system 140. The functionality of the components shown can be the same as that described above, with certain differences noted herein. For instance, in the depicted embodiment, the content server 120B includes an adaptive streaming module 122B that can dynamically adapt the amount of object data streamed to the user system 140. Likewise, the user system 140 includes an adaptive renderer 142B that can adapt audio streaming and/or the way objects are rendered by the user system 140.

As can be seen from FIG. 1B, the object-oriented encoder 112B has been moved from the audio object creation system 110B to the content server 120B. In the depicted embodiment, the audio object creation system 110B uploads audio objects instead of audio streams to the content server 120B. An adaptive streaming module 122B on the content server 120B includes the object-oriented encoder 112B. Encoding of audio objects is therefore performed on the content server 120B in the depicted embodiment. Alternatively, the audio object creation system 110B can stream encoded objects to the adaptive streaming module 122B, which decodes the audio objects for further manipulation and later re-encoding.

By encoding objects on the content server 120B, the adaptive streaming module 122B can dynamically adapt the way objects are encoded prior to streaming. The adaptive streaming module 122B can monitor available network 130 resources, such as network bandwidth, latency, and so forth. Based on the available network resources, the adaptive streaming module 122B can encode more or fewer audio objects into the audio stream. For instance, as network resources become more available, the adaptive streaming module 122B can encode relatively more audio objects into the audio stream, and vice versa.

The adaptive streaming module 122B can also adjust the types of objects encoded into the audio stream, rather (or in addition to) than the number. For example, the adaptive streaming module 122B can encode higher priority objects (such as dialog) but not lower priority objects (such as certain background sounds) when network resources are constrained. The concept of adapting streaming based on object priority is described in greater detail below.

The adaptive renderer 142B can also affect how audio objects are streamed to the user system 140. For example, the adaptive renderer 142B can communicate with the adaptive streaming module 122B to control the amount and/or type of audio objects streamed to the user system 140. The adaptive renderer 142B can also adjust the way audio streams are rendered based on the playback environment. For example, a large theater may specify the location and capabilities of many tens or hundreds of amplifiers and speakers while a self-contained TV may specify that only two amplifier channels and speakers are available. Based on this information, the systems 100A, 100B can optimize the acoustic field presentation. Many different types of rendering features in the systems 100A, 100B can be applied depending on the reproducing resources and environment, as the incoming audio stream can be descriptive and not dependant on the physical characteristics of the playback environment. These and other features of the adaptive renderer 142B are described in greater detail below.

In some embodiments, the adaptive features described herein can be implemented even if an object-oriented encoder (such as the encoder 112A) sends an encoded stream to the adaptive streaming module 122B. Instead of assembling a new audio stream on the fly, the adaptive streaming module 122B can remove objects from or otherwise filter the audio stream when computing resources or network resources become less available. For example, the adaptive streaming module 122B can remove packets from the stream corresponding to objects that are relatively less important to render. Techniques for assigning importance to objects for streaming and/or rendering are described in greater detail below.

As can be seen from the above embodiments, the disclosed systems 100A, 100B for audio distribution and playback can encompass the entire chain from initial production of audio content to the perceptual system of the listener(s). The systems 100A, 100B can be scalable and future proof in that conceptual improvements in the transmission/storage or multi-dimensional rendering system can easily be incorporated. The systems 100A, 100B can also easily scale from large format theater based presentations to home theater configurations and self contained TV audio systems.

In contrast with existing physical channel based systems, the systems 100A, 100B can abstract the production of audio content to a series of audio objects that provide information about the structure of a scene as well as individual components within a scene. The information associated with each object can be used by the systems 100A, 100B to create the most accurate representation of the information provided, given the resources available. These resources can be specified as an additional input to the systems 100A, 100B.

In addition to using physical speakers and amplifiers, the systems 100A, 100B may also incorporate psychoacoustic processing to enhance listener immersion in the acoustic environment as well as to implement positioning of 3D objects that correspond accurately to their position in the visual field. This processing can also be defined to the systems 100A, 100B (e.g., to the renderer 142) as a resource available to enhance or otherwise optimize the presentation of the audio object information contained in the transmission stream.

The stream is designed to be extensible so that additional information could be added at any time. The renderer 142A, 142B could be generic or designed to support a particular environment and resource mix. Future improvements and new concepts in audio reproduction could be incorporated at will and the same descriptive information contained in the transmission/storage stream utilized with potentially more accurate rendering. The system 100A, 100B is abstracted to the level that any future physical or conceptual improvements can easily be incorporated at any point within the system 100A, 100B while maintaining compatibility with previous content and rendering systems. Unlike current systems, the system 100A, 100B are flexible and adaptable.

For ease of illustration, this specification primarily describes object-oriented audio techniques in the context of streaming audio over a network. However, object-oriented audio techniques can also be implemented in non-network environments. For instance, an object-oriented audio stream can be stored on a computer-readable storage medium, such as a DVD disk, Blue-ray Disk, or the like. A media player (such as a Blue-ray player) can play back the object-oriented audio stream stored on the disk. An object-oriented audio package can also be downloaded to local storage on a user system and then played back from the local storage. Many other variations are possible.

It should be appreciated that the functionality of certain components described with respect to FIGS. 1A and 1B can be combined, modified, or omitted. For example, in one implementation, the audio object creation system 110 can be implemented on the content server 120. Audio streams could be streamed directly from the audio object creation system 110 to the user system 140. Many other configurations are possible.

III. Audio Object Streaming Embodiments

Figure 2:
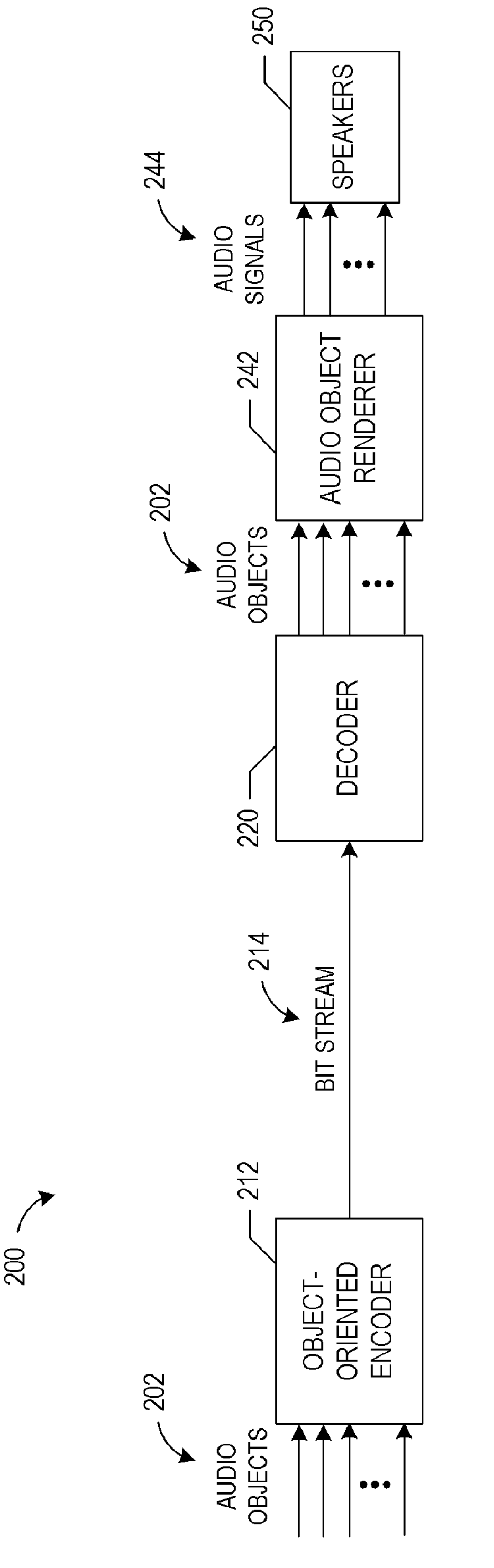
FIG. 2 illustrates another embodiment of an object-oriented audio system.

More detailed embodiments of audio object streams will now be described with respect to FIGS. 2 through 5B. Referring to FIG. 2, another embodiment of an object-oriented audio system 200 is shown. The system 200 can implement any of the features of the systems 100A, 100B described above. The system 200 can generate an object-oriented audio stream that can be decoded, rendered, and output by one or more speakers.

In the system 200, audio objects 202 are provided to an object-oriented encoder 212. The object-oriented encoder 212 can be implemented by an audio content creation system or a streaming module on a content server, as described above. The object-oriented encoder 212 can encode and/or compress the audio objects into a bit stream 214. The object-oriented encoder 212 can use any codec or compression technique to encode the objects, including compression techniques based on any of the Moving Picture Experts Group (MPEG) standards (e.g., to create MP3 files).

In certain embodiments, the object-oriented encoder 212 creates a single bit stream 214 having metadata headers and audio payloads for different audio objects. The object-oriented encoder 212 can transmit the bit stream 214 over a network (see, e.g., FIG. 1B). A decoder 220 implemented on a user system can receive the bit stream 214. The decoder 220 can decode the bit stream 214 into its constituent audio objects 202. The decoder 220 provides the audio objects 202 to a renderer 242. In some embodiments, the renderer 242 can directly implement the functionality of the decoder 220.

The renderer 242 can render the audio objects into audio signals 244 suitable for playback on one or more speakers 250. As described above, the renderer 142A can use the object attributes of the audio objects as cues on how to render the audio objects. Advantageously, in certain embodiments, because the audio objects include such attributes, the functionality of the renderer 142A can be changed without changing the format of the audio objects. For example, one type of renderer 142A might use a position attribute of an audio object to pan the audio from one speaker to another. A second renderer 142A might use the same position attribute to perform 3D psychoacoustic filtering to the audio object in response to determining that a psychoacoustic enhancement is available to the renderer 142A. In general, the renderer 142A can take into account some or all resources available to create the best possible presentation. As rendering technology improves, additional renders 142A or rendering resources can be added to the user system 140 that take advantage of the preexisting format of the audio objects.

As described above, the object-oriented encoder 212 and/or the renderer 242 can also have adaptive features.

Figure 3:
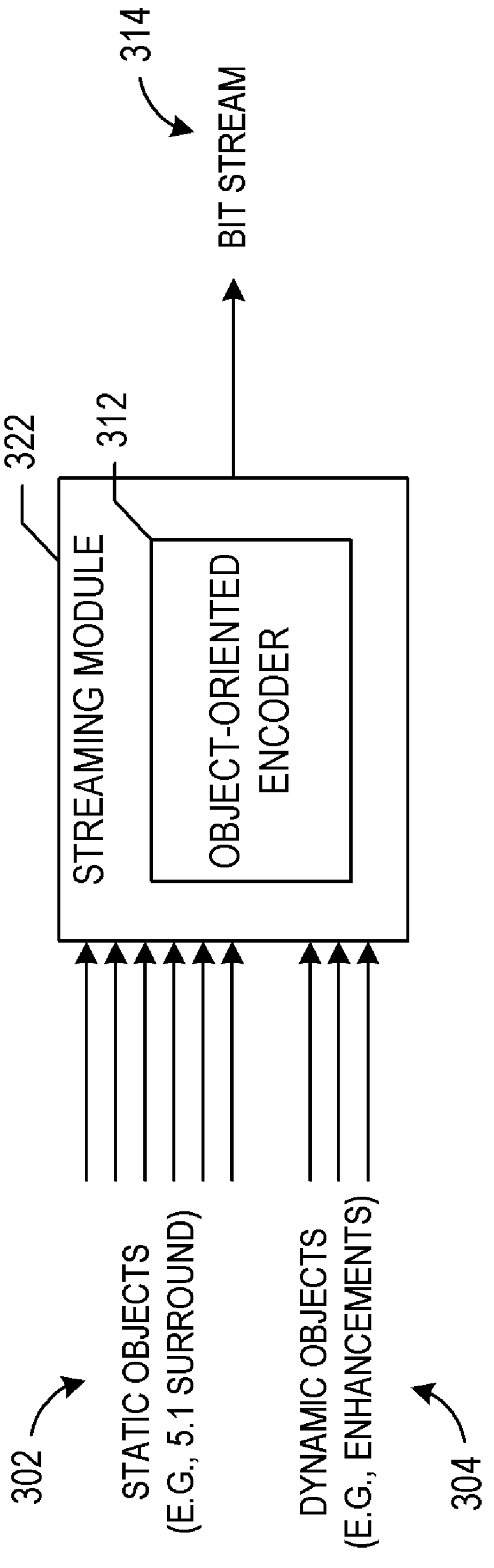
FIG. 3 illustrates an embodiment of a streaming module for use in any of the object-oriented audio systems described herein.

FIG. 3 illustrates an embodiment of a streaming module 322 for use with any of the object-oriented audio systems described herein. The streaming module 322 includes an object-oriented encoder 312. The streaming module 322 and encoder 312 can be implemented in hardware and/or software. The depicted embodiment illustrates how different types of audio objects can be encoded into a single bit stream 314.

The example streaming module 322 shown receives two different types of objects—static objects 302 and dynamic objects 304. Static objects 302 can represent channels of audio, such as 5.1 channel surround sound. Each channel can be represented as a static object 302. Some content creators may wish to use channels instead of or in addition to the object-based functionality of the systems 100A, 100B. Static objects 302 provide a way for these content creators to use channels, facilitating backwards compatibility with existing fixed channel systems and promoting ease of adoption.

Dynamic objects 304 can include any objects that can be used instead of or in addition to the static objects 302. Dynamic objects 304 can include enhancements that, when rendered together with static objects 302, enhance the audio associated with the static objects 302. For example, the dynamic objects 304 can include psychoacoustic information that a renderer can use to enhance the static objects 302. The dynamic objects 304 can also include background objects (such as a passing airplane) that a renderer can use to enhance an audio scene. Dynamic objects 304 need not be background objects, however. The dynamic objects 304 can include dialog or any other audio data.

The metadata associated with static objects 302 can be little or nonexistent. In one embodiment, this metadata simply includes the object attribute of "channel," indicating to which channel the static objects 302 correspond. As this metadata does not change in some implementations, the static objects 302 are therefore static in their object attributes. In contrast, the dynamic objects 304 can include changing object attributes, such as changing position, velocity, and so forth. Thus, the metadata associated with these objects 304 can be dynamic. In some circumstances, however, the metadata associated with static objects 302 can change over time, while the metadata associated with dynamic objects 304 can stay the same.

Further, as mentioned above, some dynamic objects 304 can contain little or no audio payload. Environment objects 304, for example, can specify the desired characteristics of the acoustic environment in which a scene takes place. These dynamic objects 304 can include information on the type of building or outdoor area where the audio scene occurs, such as a room, office, cathedral, stadium, or the like. A renderer can use this information to adjust playback of the audio in the static objects 302, for example, by applying an appropriate amount of reverberation or delay corresponding to the indicated environment. Environmental dynamic objects 304 can also include an audio payload in some implementations. Some examples of environment objects are described below with respect to FIG. 4.

Another type of object that can include metadata but little or no payload is an audio definition object. In one embodiment, a user system can include a library of audio clips or sounds that can be rendered by the renderer upon receipt of audio definition objects. An audio definition object can include a reference to an audio clip or sound stored on the user system, along with instructions for how long to play the clip, whether to loop the clip, and so forth. An audio stream can be constructed partly or even solely from audio definition objects, with some or all of the actual audio data being stored on the user system (or accessible from another server). In another embodiment, the streaming module 322 can send a plurality of audio definition objects to a user system, followed by a plurality of audio payload objects, separating the metadata and the actual audio. Many other configurations are possible.

Content creators can declare static objects 302 or dynamic objects 304 using a descriptive computer language (using, e.g., the audio object creation system 110). When creating audio content to be later streamed, a content creator can declare a desired number of static objects 302. For example, a content creator can request that a dialog static object 302 (e.g., corresponding to a center channel) or any other number of static objects 302 be always on. This "always on" property can also make the static objects 302 static. In contrast, the dynamic objects 304 may come and go and not always be present in the audio stream. Of course, these features may be reversed. It may be desirable to gate or otherwise toggle static objects 302, for instance. When dialog is not present in a given static object 302, for example, not including that static object 302 in an audio stream can save computing and network resources.

Figure 4:
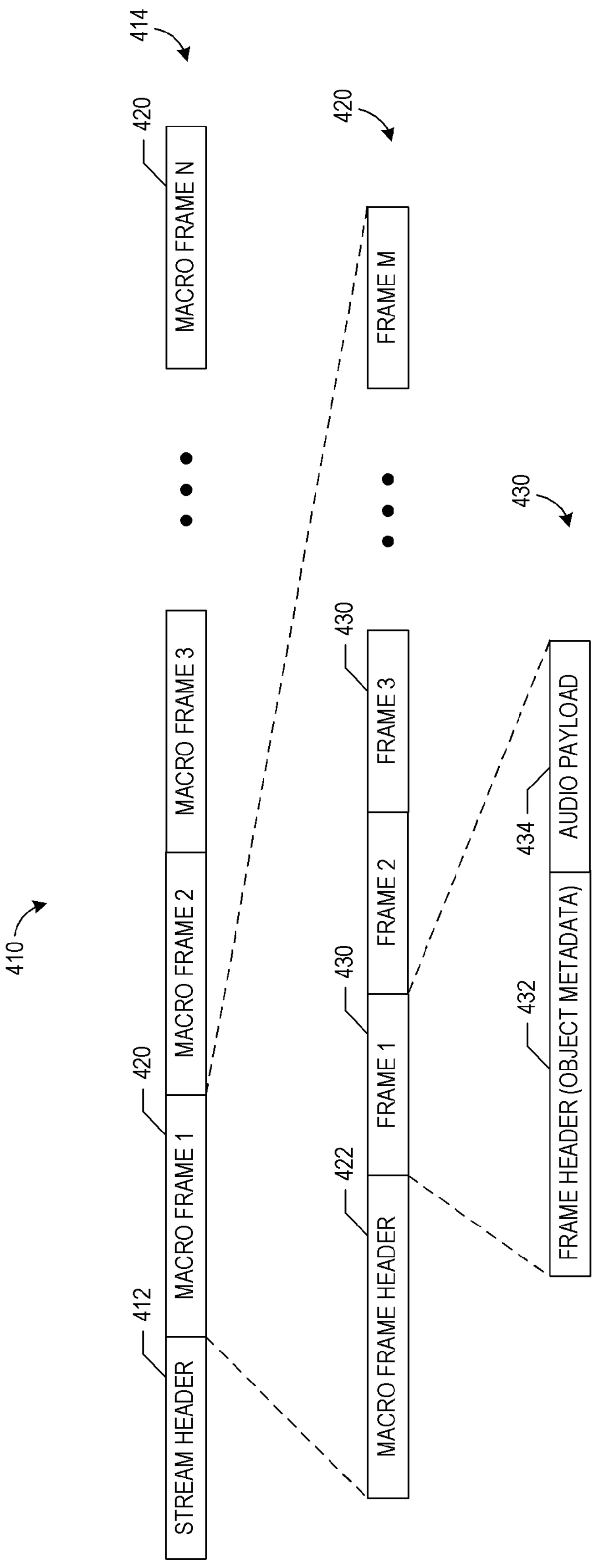
FIG. 4 illustrates an embodiment of an object-oriented audio streaming format.

FIG. 4 illustrates an embodiment of an object-oriented audio streaming format 400. The audio streaming format includes a bit stream 414, which can correspond to any of the bit streams described above. The format 400 of the bit stream 414 is broken down into successively more detailed views (420, 430). The bit stream format 400 shown is merely an example embodiment and can be varied depending on the implementation.

In the depicted embodiment, the bit stream 414 includes a stream header 412 and macro frames 420. The stream header 412 can occur at the beginning or end of the bit stream 414. Some examples of information that can be included in the stream header 412 include an author of the stream, an origin of the stream, copyright information, a timestamp related to creation and/or delivery of the stream, length of the stream, information regarding which codec was used to encode the stream, and the like. The stream header 412 can be used by a decoder and/or renderer to properly decode the stream 414.

The macro frames 420 divide the bit stream 414 into sections of data. Each macro frame 420 can correspond to an audio scene or a time slice of audio. Each macro frame 420 further includes a macro frame header 422 and individual frames 430. The macro frame header 422 can define a number of audio objects included in the macro frame, a time stamp corresponding to the macro frame 420, and so on. In some implementations, the macro frame header 422 can be placed after the frames 430 in the macro frame 420. The individual frames 430 can each represent a single audio object. However, the frames 430 can also represent multiple audio objects in some implementations. In one embodiment, a renderer receives an entire macro frame 420 before rendering the audio objects associated with the macro frame 420.

Each frame 430 includes a frame header 432 containing object metadata and an audio payload 434. In some implementations, the frame header 432 can be placed after the audio payload 434. However, as discussed above, some audio objects may have either only metadata 432 or only an audio payload 434. Thus, some frames 432 may include a frame header 432 with little or no object metadata (or no header at all), and some frames 432 may include little or no audio payload 434.

The object metadata in the frame header 432 can include information on object attributes. The following Tables illustrate examples of metadata that can be used to define object attributes. In particular, Table 1 illustrates various object attributes, organized by an attribute name and attribute description. Fewer or more than the attributes shown may be implemented in some designs.

TABLE 1

Example Object Attributes

| ATTRIBUTE NAME | ATTRIBUTE DESCRIPTION |
|---|---|
| ENABLE_PROCESS | Enable/Disable all processes, applies to all sources. |
| ENABLE_3D_POSITION | Enable/Disable the 3D Position process. |
| SRC_X | Modify the sound source's X axis position. This is relative to the listener and/or the camera. |
| SRC_Y | Modify the sound source's Y axis position. This is relative to the listener and/or the camera. |
| SRC_Z | Modify the sound source's Z axis position. This is relative to the listener and/or the camera. |
| ENABLE_DOPPLER | Enable/Disable the Doppler process. |
| DOPPLER_FACT | Permits scaling/exaggerating the Doppler pitch effect. |
| SRC_VEL_X | Modify the sound source's velocity in the X axis direction. |
| SRC_VEL_Y | Modify the sound source's velocity in the Y axis direction. |
| SRC_VEL_Z | Modify the sound source's velocity in the Z axis direction. |
| ENABLE_DISTANCE | Enable/Disable the Distance Attenuation process. |
| MINIMUM_DIST | The distance from the listener at which distance attenuation begins to attenuate the signal. |
| MAXIMUM_DIST | This distance from the listener at which distance attenuation no longer attenuates the signal. |
| SILENCE_AFT_MAX | Silence the signal after reaching the maximum distance. |
| ROLLOFF_FACT | The rate at which the source signal level decays as a function of distance from the listener. |
| LISTENER_RELATIVE | Sets whether or not the source position is relative to listener, rather than absolute or to the camera. |
| LISTENER_X | The position of the listener along the X-axis. |
| LISTENER_Y | The position of the listener along the Y-axis. |
| LISTENER_Z | The position of the listener along the Z-axis. |
| LISTENER_VEL_X | The velocity of the listener along the X-axis. |
| LISTENER_VEL_Y | The velocity of the listener along the Y-axis. |
| LISTENER_VEL_Z | The velocity of the listener along the Z-axis. |
| ENABLE_ORIENTATION | Enable/Disable the listener orientation manager (this applies to all sources). |
| LISTENER_ABOVE_X | The X-axis orientation vector above the listener. |
| LISTENER_ABOVE_Y | The Y-axis orientation vector above the listener. |
| LISTENER_ABOVE_Z | The Z-axis orientation vector above the listener. |
| LISTENER_FRONT_X | The X-axis orientation vector in front of the listener. |
| LISTENER_FRONT_Y | The Y-axis orientation vector in front of the listener. |
| LISTENER_FRONT_Z | The Z-axis orientation vector in front of the listener. |
| ENABLE_MACROSCOPIC | Enables or disables use of the Macroscopic specification of an object. |
| MACROSCOPIC_X | Specifies the x dimension size of sound emission. |
| MACROSCOPIC_Y | Specifies the y dimension size of sound emission. |
| MACROSCOPIC_Z | Specifies the z dimension size of sound emission. |
| ENABLE_SRC_ORIENT | Enables or disables the use of orientation on a source. |
| SRC_FRONT_X | The X-axis orientation vector in front of the sound object |
| SRC_FRONT_Y | The Y-axis orientation vector in front of the sound object |
| SRC_FRONT_Z | The Z-axis orientation vector in front of the sound object |
| SRC_ABOVE_X | The X-axis orientation vector above the sound object. |
| SRC_ABOVE_Y | The Y-axis orientation vector above the sound object. |
| SRC_ABOVE_Z | The Z-axis orientation vector above the sound object. |
| ENABLE_DIRECTIVITY | Enables or disables the directivity process. |
| DIRECTIVITY_MIN_ANGLE | Sets the minimum angle, normalized to 360°, for directivity attenuation. The angle is centered at about the source's front orientation creating a cone. |
| DIRECTIVITY_MAX_ANGLE | Sets the maximum angle, normalized to 360°, for directivity attenuation. |

TABLE 1-continued

| Example Object Attributes | |
|---|---|
| ATTRIBUTE NAME | ATTRIBUTE DESCRIPTION |
| DIRECTIVITY_REAR_LEVEL | Attenuates the signal by the specified fractional amount of full-scale. |
| ENABLE_OBSTRUCTION | Enables or disables the obstruction process. |
| OBSTRUCT_PRESET | A preset HF Level/Level setting (see Table 2 below). |
| REVERB_ENABLE_PROCSS | Enables/Disable the reverb process (affects all sources) |
| REVERB_DECAY | Selects the time for the reverberant signal to decay by 60 dB (overall process). |
| REVERB_MIX | Specifies the amount of original signal to processed signal to use. |
| REVERB_PRESET | Selects a predefined reverb configuration based on an environment. This may modify the decay time when changed. Several predefined presets are available (see Table 3 below). |

Example values for the OBSTRUCT_PRESET (obstruction preset) listed in Table 1 are shown below in Table 2. The obstruction preset value can affect a degree to which a sound source is occluded or blocked from the camera or listener's point of view. Thus, for example, a sound source emanating from behind a thick door can be rendered differently than a sound source emanating from behind a curtain. As discussed above, a renderer can perform any desired rendering technique (or none at all) based on the values of these and other object attributes.

TABLE 2

| Example Obstruction Presets | |
|---|---|
| Obstruction Preset | Type |
| 1 | Single Door |
| 2 | Double Door |
| 3 | Thin Door |
| 4 | Thick Door |
| 5 | Wood Wall |
| 6 | Brick Wall |
| 7 | Stone Wall |
| 8 | Curtain |

Like the obstruction preset (sometimes referred to as occlusion), the REVERB_PRESET (reverberation preset) can include example values as shown in Table 3. These reverberation values correspond to types of environments in which a sound source may be located. Thus, a sound source emanating in an auditorium might be rendered differently than a sound source emanating in a living room. In one embodiment, an environment object includes a reverberation attribute that includes preset values such as those described below.

TABLE 3

| Example Reverberation Presets | |
|---|---|
| Reverb Preset | Type |
| 1 | Alley |
| 2 | Arena |
| 3 | Auditorium |
| 4 | Bathroom |
| 5 | Cave |
| 6 | Chamber |
| 7 | City |
| 8 | Concert Hall |
| 9 | Forest |
| 10 | Hallway |
| 11 | Hangar |
| 12 | Large Room |
| 13 | Living Room |

TABLE 3-continued

| Example Reverberation Presets | |
|---|---|
| Reverb Preset | Type |
| 14 | Medium Room |
| 15 | Mountains |
| 16 | Parking Garage |
| 17 | Plate |
| 18 | Room |
| 19 | Under Water |

In some embodiments, environment objects are not merely described using the reverberation presets described above. Instead, environment objects can be described with one or more attributes such as an amount of reverberation (that need not be a preset), an amount of echo, a degree of background noise, and so forth. Many other configurations are possible. Similarly, attributes of audio objects can generally have forms other than values. For example, an attribute can contain a snippet of code or instructions that define a behavior or characteristic of a sound source.

Figure 5A:
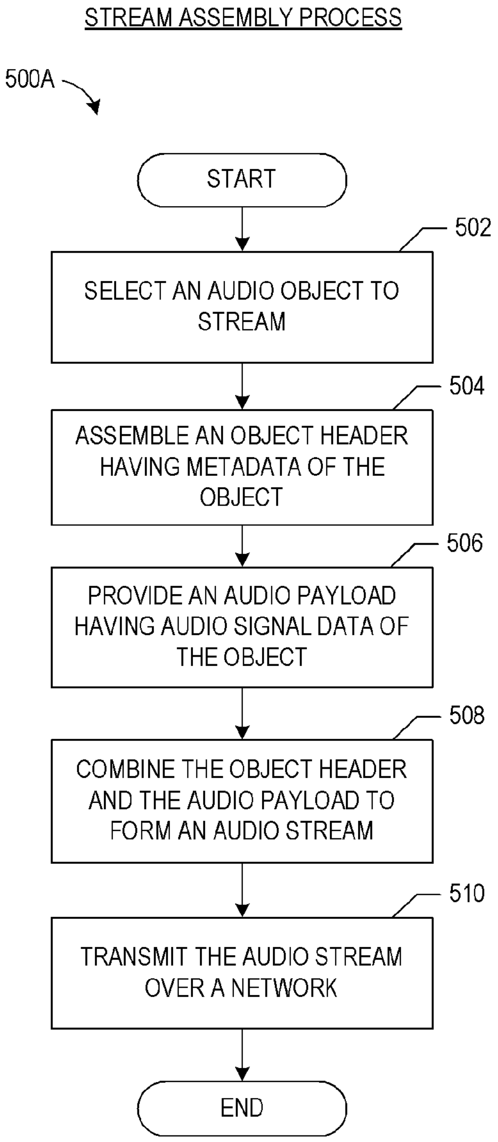
FIG. 5A illustrates an embodiment of an audio stream assembly process.

FIG. 5A illustrates an embodiment of an audio stream assembly process 500A. The audio stream assembly process 500A can be implemented by any of the systems described herein. For example, the stream assembly process 500A can be implemented by any of the object-oriented encoders or streaming modules described above. The stream assembly process 500A assembles an audio stream from at least one audio object.

At block 502, an audio object is selected to stream. The audio object may have been created by the audio object creation module 110 described above. As such, selecting the audio object can include accessing the audio object in the object data repository 116. Alternatively, the streaming module 122 can access the audio object from computer storage. For ease of illustration, this example FIGURE describes streaming a single object, but it should be understood that multiple objects can be streamed in an audio stream. The object selected can be a static or dynamic object. In this particular example, the selected object has metadata and an audio payload.

An object header having metadata of the object is assembled at block 504. This metadata can include any description of object attributes, some examples of which are described above. At block 506, an audio payload having the audio signal data of the object is provided.

The object header and the audio payload are combined to form the audio stream at block 508. Forming the audio stream can include encoding the audio stream, compressing the audio stream, and the like. At block 510, the audio stream is transmitted over a network. While the audio stream can be streamed using any streaming technique, the audio stream can also be uploaded to a user system (or conversely, downloaded by the user system). Thereafter, the audio stream can be rendered by the user system, as described below with respect to FIG. 5B.

Figure 5B:
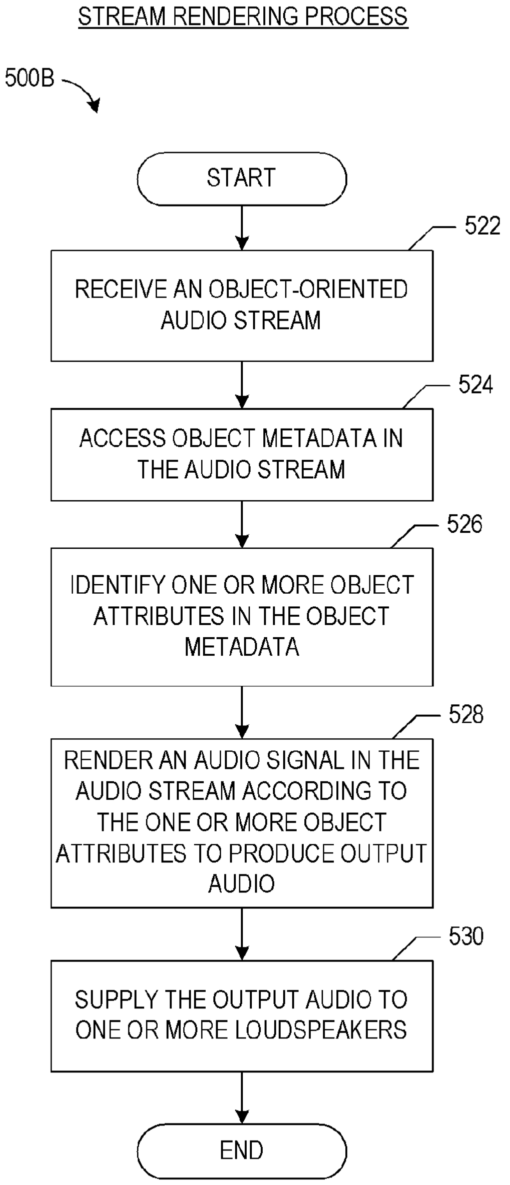
FIG. 5B illustrates an embodiment of an audio stream rendering process.

FIG. 5B illustrates an embodiment of an audio stream rendering process 500B. The audio stream rendering process 500B can be implemented by any of the systems described herein. For example, the stream rendering process 500B can be implemented by any of the renderers described herein.

At block 522, an object-oriented audio stream is received. This audio stream may have been created using the techniques of the process 500A or with other techniques described above. Object metadata in the audio stream is accessed at block 524. This metadata may be obtained by decoding the stream using, for example, the same codec used to encode the stream.

One or more object attributes in the metadata are identified at block 526. Values of these object attributes can be identified by the renderer as cues for rendering the audio objects in the stream.

An audio signal in the audio stream is rendered at block 528. In the depicted embodiment, the audio stream is rendered according to the one or more object attributes to produce output audio. The output audio is supplied to one or more loudspeakers at block 530.

IV. Adaptive Streaming and Rendering Embodiments

An adaptive streaming module 122B and adaptive renderer 142B were described above with respect to FIG. 1B. More detailed embodiments of an adaptive streaming module 622 and an adaptive renderer 642 are shown in the system 600 of FIG. 6.

In FIG. 6, the adaptive streaming module 622 has several components, including a priority module 624, a network resource monitor 626, an object-oriented encoder 612, and an audio communications module 628. The adaptive renderer 642 includes a computing resource monitor 644 and a rendering module 646. Some of the components shown may be omitted in different implementations. The object-oriented encoder 612 can include any of the encoding features described above. The audio communications module 628 can transmit the bit stream 614 to the adaptive renderer 642 over a network (not shown).

The priority module 624 can apply priority values or other priority information to audio objects. In one embodiment, each object can have a priority value, which may be a numeric value or the like. Priority values can indicate the relative importance of objects from a rendering standpoint. Objects with higher priority can be more important to render than objects of lower priority. Thus, if resources are constrained, objects with relatively lower priority can be ignored. Priority can initially be established by a content creator, using the audio object creation systems 110 described above.

As an example, a dialog object that includes dialog for a video might have a relatively higher priority than a background sound object. If the priority values are on a scale from 1 to 5, for instance, the dialog object might have a priority value of 1 (meaning the highest priority), while a background sound object might have a lower priority (e.g., somewhere from 2 to 5). The priority module 624 can establish thresholds for transmitting objects that satisfy certain priority levels. For instance, the priority module 624 can establish a threshold of 3, such that objects having priority of 1, 2, and 3 are transmitted to a user system while objects with a priority of 4 or 5 are not.

The priority module 624 can dynamically set this threshold based on changing network conditions, as determined by the network resource monitor 626. The network resource monitor 626 can monitor available network resources or other quality of service measures, such as bandwidth, latency, and so forth. The network resource monitor 626 can provide this information to the priority module 624. Using this information, the priority module 624 can adjust the threshold to allow lower priority objects to be transmitted to the user system if network resources are high. Similarly, the priority module 624 can adjust the threshold to prevent lower priority objects from being transmitted when network resources are low.

The priority module 624 can also adjust the priority threshold based on information received from the adaptive renderer 642. The computing resource module 644 of the adaptive renderer 642 can identify characteristics of the playback environment of a user system, such as the number of speakers connected to the user system, the processing capability of the user system, and so forth. The computing resource module 644 can communicate the computing resource information to the priority module 624 over a control channel 650. Based on this information, the priority module 624 can adjust the threshold to send both higher and lower priority objects if the computing resources are high and solely higher priority objects if the computing resources are low. The computing resource monitor 644 of the adaptive renderer 642 can therefore control the amount and/or type of audio objects that are streamed to the user system.

The adaptive renderer 642 can also adjust the way audio streams are rendered based on the playback environment. If the user system is connected to two speakers, for instance, the adaptive renderer 642 can render the audio objects on the two speakers. If additional speakers are connected to the user system, the adaptive renderer 642 can render the audio objects on the additional channels as well. The adaptive renderer 642 may also apply psychoacoustic techniques when rendering the audio objects on one or two (or sometimes more) speakers.

The priority module 624 can change the priority of audio objects dynamically. For instance, the priority module 624 can set objects to have relative priority to one another. A dialog object, for example, can be assigned a highest priority value by the priority module 624. Other objects' priority values can be relative to the priority of the dialog object. Thus, if the dialog object is not present for a period of time in the audio stream, the other objects can have relatively higher priority.

FIG. 7 illustrates an embodiment of an adaptive streaming process 700. The adaptive streaming process 700 can be implemented by any of the systems described above, such as the system 600. The adaptive streaming process 700 facilitates efficient use of streaming resources.

Blocks 702 through 708 can be performed by the priority module 624 described above. At block 702, a request is received from a remote computer for audio content. A user system can send the request to a content server, for instance. At block 704, computing resource information regarding resources of the remote computer system are received. This computing resource information can describe various available resources of the user system and can be provided together with the audio content request. Network resource information regarding available network resources is also received at block 726. This network resource information can be obtained by the network resource monitor 626.

A priority threshold is set at block 708 based at least partly on the computer and/or network resource information. In one embodiment, the priority module 624 establishes a lower threshold (e.g., to allow lower priority objects in the stream) when both the computing and network resources are relatively high. The priority module 624 can establish a higher threshold (e.g., to allow higher priority objects in the stream) when either computing or network resources are relatively low.

Blocks 710 through 714 can be performed by the object-oriented encoder 612. At decision block 710, for a given object in the requested audio content, it is determined whether the priority value for that object satisfies the previously established threshold. If so, at block 712, the object is added to the audio stream. Otherwise, the object is not added to the audio stream, thereby advantageously saving network and/or computing resources in certain embodiments.

It is further determined at block 714 whether additional objects remain to be considered for adding to the stream. If so, the process 700 loops back to block 710. Otherwise, the audio stream is transmitted to the remote computing system at block 716, for example, by the audio communications module 628.

The process 700 can be modified in some implementations to remove objects from a pre-encoded audio stream instead of assembling an audio stream on the fly. For instance, in block 710, if a given object has a priority that does not satisfy a threshold, at block 712, the object can be removed from the audio stream. Thus, content creators can provide an audio stream to a content server with a variety of objects, and the adaptive streaming module at the content server can dynamically remove some of the objects based on the objects' priorities. Selecting audio objects for streaming can therefore include adding objects to a stream, removing objects from a stream, or both.

FIG. 8 illustrates an embodiment of an adaptive rendering process 800. The adaptive rendering process 800 can be implemented by any of the systems described above, such as the system 600. The adaptive rendering process 800 also facilitates efficient use of streaming resources.

At block 802, an audio stream having a plurality of audio objects is received by a renderer of a user system. For example, the adaptive renderer 642 can receive the audio objects. Playback environment information is accessed at block 804. The playback environment information can be accessed by the computing resource monitor 644 of the adaptive renderer 642. This resource information can include information on speaker configurations, computing power, and so forth.

Blocks 806 through 810 can be implemented by the rendering module 646 of the adaptive renderer 642. At block 806, one or more audio objects are selected based at least partly on the environment information. The rendering module 646 can use the priority values of the objects to select the objects to render. In another embodiment, the rendering module 646 does not select objects based on priority values, but instead down-mixes objects into fewer speaker channels or otherwise uses less processing resources to render the audio. The audio objects are rendered to produce output audio at block 808. The rendered audio is output to one or more speakers at block 810.

V. Audio Object Creation Embodiments

FIGS. 9 through 11 describe example audio object creation techniques in the context of audio-visual reproductions, such as movies, television, podcasting, and the like. However, some or all of the features described with respect to FIGS. 9 through 11 can also be implemented in the pure audio context (e.g., without accompanying video).

FIG. 9 illustrates an example scene 900 for object-oriented audio capture. The scene 900 represents a simplified view of an audio-visual scene such as may be constructed for a movie, television, or other video. In the scene 900, two actors 910 are performing, and their sounds and actions are recorded by a microphone 920 and camera 930 respectively. For simplicity, a single microphone 920 is illustrated, although in some cases the actors 910 may wear individual microphones. Similarly, individual microphones can also be supplied for props (not shown).

In order to determine the location, velocity, and other attributes of the sound sources (e.g., the actors) in the present scene 900, location-tracking devices 912 are provided. These location-tracking devices 912 can include GPS devices, motion capture suits, laser range finders, and the like. Data from the location-tracking devices 912 can be transmitted to the audio object creation system 110 together with data from the microphone 920 (or microphones). Time stamps included in the data from the location-tracking devices 912 can be correlated with time stamps obtained from the microphone 920 and/or camera 930 so as to provide position data for each instance of audio. This position data can be used to create audio objects having a position attribute. Similarly, velocity data can be obtained from the location-tracking devices 912 or can be derived from the position data.

The location data from the location-tracking devices 912 (such as GPS-derived latitude and longitude) can be used directly as the position data or can be translated to a coordinate system. For instance, Cartesian coordinates 940 in three dimensions (x, y, and z) can be used to track audio object position. Coordinate systems other than Cartesian coordinates may be used as well, such as spherical or cylindrical coordinates. The origin for the coordinate system 940 can be the camera 930 in one embodiment. To facilitate this arrangement, the camera 930 can also include a location-tracking device 912 so as to determine its location relative to the audio objects. Thus, even if the camera's 930 position changes, the position of the audio objects in the scene 900 can still be relative to the camera's 930 position.

Positition data can also be applied to audio objects during post-production of an audio-visual production. For animation productions, the coordinates of animated objects (such as characters) can be known to the content creators. These coordinates can be automatically associated with the audio produced by each animated object to create audio objects.

FIG. 10 schematically illustrates a system 1000 for object-oriented audio capture that can implement the features described above with respect to FIG. 9. In the system 1000, sound source location data 1002 and microphone data 1006 are provided to an object creation module 1014. The object creation module 1014 can include all the features of the object creation modules 114A, 114B described above. The object creation module 1014 can correlate the sound source location data 1002 for a given sound source with the microphone data 1006 based on timestamps 1004, 1008, as described above with respect to FIG. 9.

Additionally, the object creation module 1014 includes an object linker 1020 that can link or otherwise associate objects together. Certain audio objects may be inherently related to one another and can therefore be automatically linked together by the object linker 1020. Linked objects can be rendered together in ways that will be described below.

Objects may be inherently related to each other because the objects are related to a same higher class of object. In other words, the object creation module 1014 can form hierarchies of objects that include parent objects and child objects that are related to and inherent properties of the parent objects. In this manner, audio objects can borrow certain object-oriented principles from computer programming languages. An example of a parent object that may have child objects is a marching band. A marching band can have several sections corresponding to different groups of instruments, such as trombones, flutes, clarinets, and so forth. A content creator using the object creation module 1014 can assign the band to be a parent object and each section to be a child object. Further, the content creator can also assign the individual band members to be child objects of the section objects. The complexity of the object hierarchy, including the number of levels in the hierarchy, can be established by the content creator.

As mentioned above, child objects can inherit properties of their parent objects. Thus, child objects can inherit some or all of the metadata of their parent objects. In some cases, child objects can also inherit some or all of the audio signal data associated with their parent objects. The child objects can modify some or all of this metadata and/or audio signal data. For example, a child object can modify a position attribute inherited from the parent so that the child and parent have differing positions but other similar metadata.

The child object's position can also be represented as an offset from the parent object's position or can otherwise be derived from the parent object's position. Referring to the marching band example, a section of the band can have a position that is offset from the band's position. As the band changes position, the child object representing the band section can automatically update its position based on the offset and the parent band's position. In this manner, different sections of the band having different position offsets can move together.

Inheritance between child and parent objects can result in common metadata between child and parent objects. This overlap in metadata can be exploited by any of the object-oriented encoders described above to optimize or reduce data in the audio stream. In one embodiment, an object-oriented encoder can remove redundant metadata from the child object, replacing the redundant metadata with a reference to the parent's metadata. Likewise, if redundant audio signal data is common to the child and parent objects, the object-oriented encoder can reduce or eliminate the redundant audio signal data. These techniques are merely examples of many optimization techniques that the object-oriented encoder can implement to reduce or eliminate redundant data in the audio stream.

Moreover, the object linker 1020 of the object creation module 1014 can link child and parent objects together. The object linker 1020 can perform this linking by creating an association between the two objects, which may be reflected in the metadata of the two objects. The object linker 1020 can store this association in an object data repository 1016. Also, in some embodiments, content creators can manually link objects together, for example, even when the objects do not have parent-child relationships.

When a renderer receives two linked objects, the renderer can choose to render the two objects separately or together. Thus, instead of rendering a marching band as a single point source on one speaker, for instance, a renderer can render the marching band as a sound field of audio objects together on a variety of speakers. As the band moves in a video, for instance, the renderer can move the sound field across the speakers.

More generally, the renderer can interpret the linking information in a variety of ways. The renderer may, for instance, render linked objects on the same speaker at different times, delayed from one another, or on different speakers at the same time, or the like. The renderer may also render the linked objects at different points in space determined psychoacoustically, so as to provide the impression to the listener that the linked objects are at different points around the listener's head. Thus, for example, a renderer can cause the trombone section to appear to be marching to the left of a listener while the clarinet section is marching to the right of the listener.

FIG. 11 illustrates an embodiment of a process 1100 for object-oriented audio capture. The process 1100 can be implemented by any of the systems described herein, such as the system 1000. For example, the process 1100 can be implemented by the object linker 1020 of the object creation module 1014.

At block 1102, audio and location data are received for first and second sound sources. The audio data can be obtained using a microphone, while the location data can be obtained using any of the techniques described above with respect to FIG. 9.

A first audio object is created for the first sound source at block 1104. Similarly, a second audio object is created for the second sound source at block 1106. An association is created between the first and second sound sources at block 1108. This association can be created automatically by the object linker 1020 based on whether the two objects are related in an object hierarchy. Further, the object linker 1020 can create the association automatically based on other metadata associated with the objects, such as any two similar attributes. The association is stored in computer storage at block 1110.

VI. Terminology

Depending on the embodiment, certain acts, events, or functions of any of the algorithms described herein can be performed in a different sequence, can be added, merged, or left out all together (e.g., not all described acts or events are necessary for the practice of the algorithm). Moreover, in certain embodiments, acts or events can be performed concurrently, e.g., through multi-threaded processing, interrupt processing, or multiple processors or processor cores or on other parallel architectures, rather than sequentially.

The various illustrative logical blocks, modules, and algorithm steps described in connection with the embodiments disclosed herein can be implemented as electronic hardware, computer software, or combinations of both. To clearly illustrate this interchangeability of hardware and software, various illustrative components, blocks, modules, and steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

The various illustrative logical blocks and modules described in connection with the embodiments disclosed herein can be implemented or performed by a machine, such as a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor can be a microprocessor, but in the alternative, the processor can be a controller, microcontroller, or state machine, combinations of the same, or the like. A processor can also be implemented as a combination of computing devices, e.g., a combination of a DSP and a microprocessor, a plurality of microprocessors, one or more microprocessors in conjunction with a DSP core, or any other such configuration.

The steps of a method, process, or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of computer-readable storage medium known in the art. An exemplary storage medium can be coupled to the processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

Conditional language used herein, such as, among others, "can," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A system for adapting transmission and rendering of an object-oriented audio stream, the system comprising:
- a computing resource monitor implemented by a computer system, the computing resource monitor configured to access resource information regarding available computing resources of the computer system; and
- a rendering module implemented by the computer system, the rendering module configured to:
  - receive an audio stream from a remote server, the audio stream comprising a plurality of audio objects, the plurality of audio objects comprising:
    - channel objects, each channel object comprising a channel of audio, and
    - dynamic objects, each dynamic object comprising metadata, the metadata for each of the dynamic objects comprising object attributes and a priority value;
  - access environment information regarding the available computing resources of the computer system;
  - select with the computer system, one or more of the plurality of audio objects based at least partly on the available computing resources and the priority values of the dynamic objects, said selecting comprising selecting relatively more of the dynamic objects for rendering when the available computing resources have relatively more audio-rendering capability and selecting relatively fewer of the dynamic objects for rendering when the available computing resources have relatively lower audio-rendering capability;
  - render the selected one or more audio objects to produce output audio;
  - supply the output audio to one or more speakers; and
  - communicate the information regarding the computing resources of the computer system to the remote server to thereby enable the remote server to adjust an amount of the objects that are transmitted by the remote server to the computer system.

2. A method of adapting rendering of an object-oriented audio stream, the method comprising:
- receiving, with a computer system, an audio stream from a remote server over a network, the audio stream comprising a plurality of audio objects, the plurality of audio objects comprising:
  - channel objects, each channel object comprising a channel of audio, and
  - dynamic objects, each dynamic object comprising metadata, the metadata for each of the dynamic objects comprising object attributes and a priority value, the object attributes for each of the dynamic object comprising information regarding one or more of the following: location of the object, velocity of the object, and occlusion of the object;
- accessing environment information regarding a playback environment associated with the computer system, the information regarding the playback environment comprising information regarding audio-rendering capabilities of the computer system;
- selecting, with the computer system, one or more of the dynamic objects based at least partly on the environment information and the priority values of the dynamic objects, said selecting comprising selecting relatively more of the dynamic objects for rendering when the playback environment has relatively more audio-rendering capability and selecting relatively fewer of the dynamic objects for rendering when the playback environment has relatively lower audio-rendering capability;
- communicating the information regarding the computing resources of the computer system to the remote server to thereby enable the remote server to adjust an amount of the dynamic objects that are transmitted by the remote server to the computer system;
- rendering the selected one or more dynamic objects and the channel objects to produce output audio; and
- supplying the output audio to one or more speakers.

3. The method of claim 2, wherein the environment information comprises information regarding one or more of the following: a number of speakers connected to the computer system, a type of device of the computer system, psychoacoustic processing capability of the computing system, software installed on the computing system, and hardware characteristics of the computing system.

4. The method of claim 2, wherein said rendering comprises applying a psychoacoustic enhancement to the one or more audio objects in response to determining a number of speakers in the playback environment.

* * * * *